United States Patent
Edwards

(10) Patent No.: US 9,736,428 B1
(45) Date of Patent: Aug. 15, 2017

(54) PROVIDING REMOTE VISITATION AND OTHER SERVICES TO NON-RESIDENTS OF CONTROLLED-ENVIRONMENT FACILITIES VIA DISPLAY DEVICES

(71) Applicant: Securus Technologies, Inc., Dallas, TX (US)

(72) Inventor: Adam C. Edwards, Fort Worth, TX (US)

(73) Assignee: Securus Technologies, Inc., Carrollton, TX (US)

( * ) Notice: Subject to any disclaimer, the term of this patent is extended or adjusted under 35 U.S.C. 154(b) by 44 days.

(21) Appl. No.: 14/242,062

(22) Filed: Apr. 1, 2014

(51) Int. Cl.
*H04N 7/14* (2006.01)

(52) U.S. Cl.
CPC ............ *H04N 7/147* (2013.01); *H04N 7/142* (2013.01)

(58) Field of Classification Search
USPC .............. 348/14.01–14.08; 370/352; 725/14
See application file for complete search history.

(56) References Cited

U.S. PATENT DOCUMENTS

| | | | | |
|---|---|---|---|---|
| 7,283,782 B2* | 10/2007 | Sinnarajah | ............ | H04W 36/08 370/328 |
| 2006/0256188 A1* | 11/2006 | Mock et al. | ............... | 348/14.09 |
| 2007/0269031 A1* | 11/2007 | Honig | ................ | H04M 3/4878 379/142.01 |
| 2007/0291736 A1* | 12/2007 | Furlong | .............. | H04L 12/2803 370/352 |
| 2008/0068447 A1* | 3/2008 | Mattila et al. | ............. | 348/14.08 |
| 2010/0180313 A1* | 7/2010 | Bi | .................. | 725/110 |
| 2011/0047473 A1* | 2/2011 | Hanna | .................... | G06Q 10/06 715/740 |
| 2011/0078716 A1* | 3/2011 | MacWan | ................ | H04N 7/173 725/14 |
| 2013/0194377 A1* | 8/2013 | Humphries | ................ | 348/14.08 |
| 2014/0068466 A1* | 3/2014 | Garcia et al. | ................. | 715/756 |

* cited by examiner

*Primary Examiner* — Maria El-Zoobi
(74) *Attorney, Agent, or Firm* — Fogarty LLP

(57) ABSTRACT

Systems and methods for providing remote visitation and other services to non-residents of controlled-environment facilities via display devices. In some embodiments, a method may include performing, by one or more computer systems, receiving a command to initiate a remote visitation session between a resident and a non-resident of a controlled-environment facility, and enabling the non-resident's participation in the remote visitation session, wherein the non-resident participates in the remote visitation session using a display device selected from the group consisting of: a display device set, a projector, and a monitor.

17 Claims, 4 Drawing Sheets

PROVIDING REMOTE VISITATION AND OTHER SERVICES TO NON-RESIDENTS OF CONTROLLED-ENVIRONMENT FACILITIES VIA DISPLAY DEVICES

TECHNICAL FIELD

This specification relates generally to controlled-environment facilities, and, more particularly, to systems and methods for providing remote visitation and other services to non-residents of controlled-environment facilities via display devices.

BACKGROUND

According to the International Centre for Prison Studies, the United States has the highest prison population per capita in the world. In 2009, for example, 1 out of every 135 U.S. residents was incarcerated. Typically, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions.

To enable these various types of communications, a jail or prison may install communication devices in different parts of the facility. Such communication devices are dedicated to provide inmate contact with the outside world. These devices are located in different areas throughout the facility. At the time of a scheduled visitation, an officer may physically move the inmate from his or her cell to a communication device or station in a designated area within the correctional facility, where he or she may be able to conduct a remote visitation with friends, family, acquaintances, etc. When the communication is over, the officer may then escort the inmate back to his or her cell.

From a non-resident's perspective, the inventor hereof has recognized that existing remote visitation systems are computer-based. In other words, in order for a non-resident of a controlled-environment facility to conduct a remote visitation session with an inmate of that facility, the non-resident must generally have access to a personal computer. The non-resident must also be sufficiently knowledgeable about computer systems—and sometimes computer networking—to be able to independently operate his or her computer and initiate a visitation session. As a result, despite the recent technological advances, a large portion of inmates' friends and family remains without a viable way to participate in remote visitations.

Fortunately, the inventor hereof has also recognized that most households have a television set or the like, as well as cable or satellite service, which are more generally accessible to everybody. Accordingly, to address the foregoing concerns associated with computer-based remote visitation systems, the inventor hereof has developed systems and methods for providing remote visitation and other services to non-residents via display devices such as, for example, television sets, projectors, or monitors.

SUMMARY

Embodiments disclosed herein are directed to providing remote visitation and other services to non-residents of controlled-environment facilities via display devices. In an illustrative, non-limiting embodiment, a method may include performing, by one or more computer systems, receiving a command to initiate a remote visitation session between a resident and a non-resident of a controlled-environment facility, and enabling the non-resident's participation in the remote visitation session, wherein the non-resident participates in the remote visitation session using a display device selected from the group consisting of: a display device set, a projector, and a monitor.

The one or more computer systems may be controlled by a cable or satellite display device service provider. The controlled-environment facility may be a correctional facility and the resident may be a prisoner, inmate, detainee, or arrestee.

The non-resident's participation in the remote visitation session may include providing an incoming multimedia visitation signal to the display device through a cable or satellite receiver and receiving an outgoing multimedia visitation signal from the display device through the cable or satellite receiver. The outgoing multimedia signal may include a video image of the non-resident captured by a camera coupled to or integrated into the display device. An aspect of a television programming available to the non-resident may be based, at least in part, upon the remote visitation session. The aspect may include, for example, a channel lineup, a channel ordering, or a television advertisement.

In one embodiment, the non-resident may control the visitation session using a remote control associated with the display device. The non-resident's participation in the remote visitation session may include providing an incoming multimedia visitation signal to the display device through a streaming plug-in device and receiving an outgoing multimedia visitation signal from the display device through the streaming plug-in device, wherein the streaming plug-in device is coupled to or otherwise integrated into the display device.

The non-resident may participate in a commissary transaction, a video game, information services, financial transaction, billing review, a slideshow presentation, or watching a motion picture, associated with the resident through the display device.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

Figure 1:
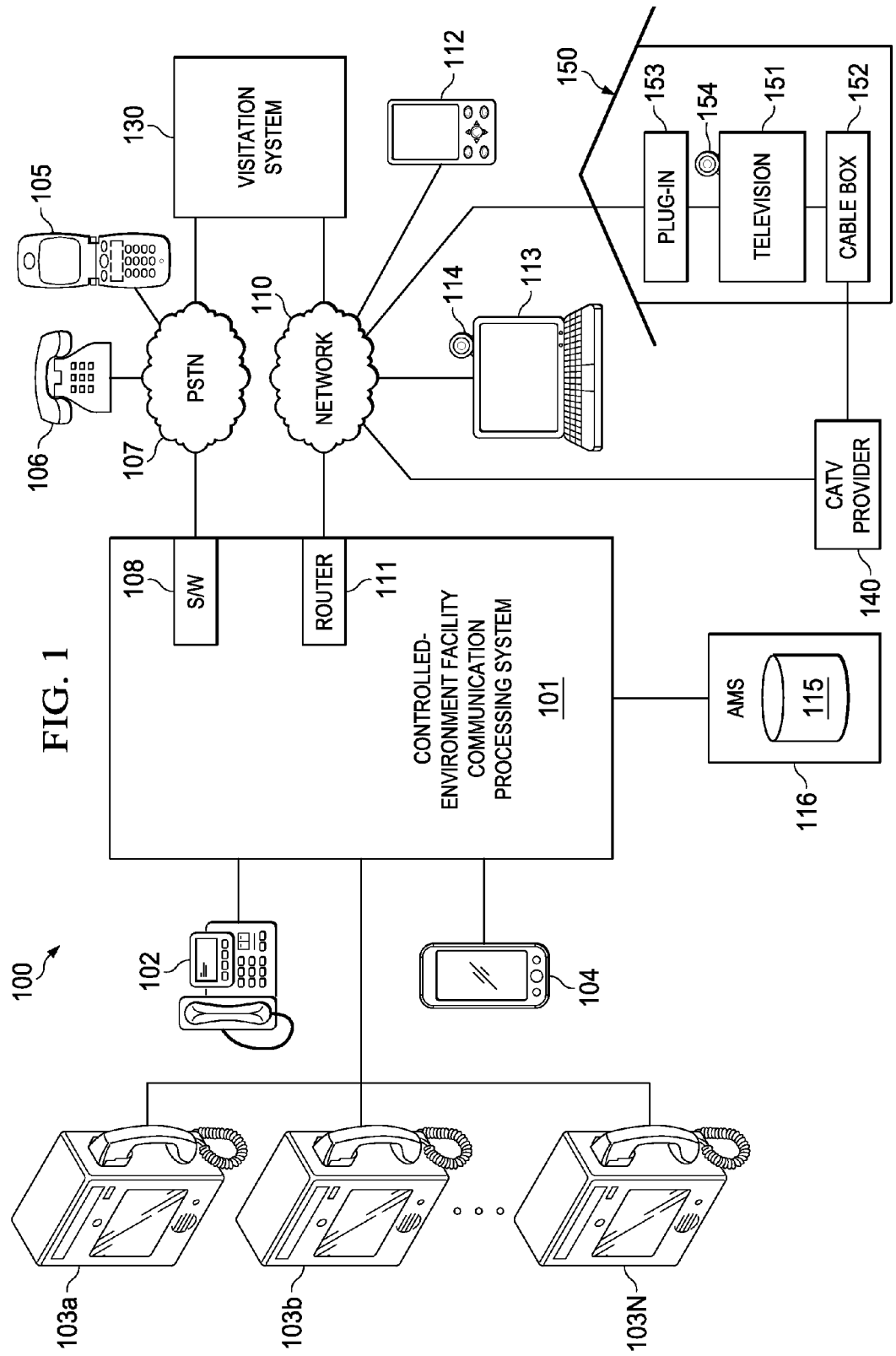
FIG. 1 is a block diagram of an example of an environment where a visitation system may be employed according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses remote multi-party and/or event-driven visitation for residents of controlled-environment facilities. Various types of controlled environment facilities are present in today's society, and persons may be voluntary or involuntary residents of such facilities, whether temporarily or permanently. Examples of controlled environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled environment facility may be referred to as a jail or prison, and its residents may be referred to as arrestees, detainees, or inmates.

The inventor hereof has recognized that correctional facilities present numerous difficulties in areas such as security, surveillance, financial transactions, communications, visitation, investigation, budgetary, etc.; which in turn make technological implementations uniquely challenging in those environments. In many cases, technologies that are used outside of correctional facilities are not immediately applicable to the correctional environment without significant changes and modifications. Moreover, correctional facilities may have specific needs that are not particularly relevant outside of those environments.

As such, some of the systems and methods described herein may be specifically tailored to address one or more of the aforementioned needs and challenges. It should be understood, however, that other systems and methods described herein may also be applicable to other types of controlled environment facilities and their respective residents (e.g., a hospital and its patients) and, in some cases, may be applicable to environments that are not controlled at all.

Turning now to FIG. 1, a block diagram of environment 100 where a visitation system may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102 and/or 104.

Under the control of communication processing system 101, devices 102 and 104 may be capable of connecting to a non-resident's (i.e., a person not incarcerated or otherwise committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may operate devices 112 or 113, which may be connected through an Integrated Services Digital Network (ISDN), Voice-over-IP (VoIP), or packet data network 110, such as, for example the Internet. Router 111 of communication system 101 is used to route data packets associated with a call connection to devices 112 or 113.

Video visitation devices 103A-N (each collectively referred to as "video visitation device 103") may have video conferencing capabilities to enable inmates to participate in video visitation sessions with non-residents of the correctional facility via video communication, secure online chat, etc. For example, a non-resident party may have a personal or laptop computer 113 with camera 114 (or a cell phone, tablet computer, etc.). Additionally or alternatively, device 112 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, kiosk, etc.

In various implementations, a non-resident may be at premises 150 (e.g., his or her home, office, hotel room, etc.), which includes display device 151 (e.g., a television set, projector, or display) served by cable or satellite (CATV) provider 140. Particularly, CATV provider 140 may receive television signals (e.g., from a satellite antenna, television station, etc.) and it may provide them to display device 151 via cable box or receiver 152. Moreover, CATV provider may also be coupled to visitation system 130 and/or communication system 101 via network 110 in order to receive and/or manage video visitation signals. To facilitate the visitation session, display device 151 may include or otherwise be coupled to camera and/or microphone 154. In some cases, a non-resident may be allowed to control a visitation session (e.g., begin and end session, etc.) using a remote control associated with display device 151 and/or receiver 152.

Additionally or alternatively, streaming plug-in device 153 may be coupled to display device 151, for example, via a Universal Serial Bus (USB), High-Definition Multimedia Interface (HDMI) port or the like. Examples of streaming plug-in device 153 include, but are not limited to, ROKU®, CHROMECAST®, APPLE TV®, etc. Streaming plug-in device 153 may include a wired (e.g., Ethernet) or wireless interface (e.g., WiFi) that allows it connect to network 110 via a router, switch, or modem (not shown), or any other suitable network infrastructure.

In some cases, streaming plug-in device 153 may be replaced with a video game console or the like. Additionally or alternatively, camera and/or microphone 154 may be connected to streaming plug-in device 153 and/or receiver 152.

In addition to providing certain visitation and communication operations, communication processing system 101 may attempt to ensure that a resident's calls, video conferences, online chats, etc. are performed only with non-residents whose identities, devices, email addresses, phone numbers, etc. are listed in that resident's Pre-Approved Contact (PAC) list. Each resident's PAC list may be stored, for example, in database 115 maintained by Administration and Management System (AMS) 116. In addition to PAC list(s), AMS 116 may also store resident profile data (RPD), as well as communication and/or visitation rules applicable to each resident.

As an example, in the context of a correctional facility, AMS 116 is referred to as a Jail Management System (JMS). Within the AMS or JMS 116, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 112, 113 and/or 151. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitation sessions (e.g., as electronic video files). In scenarios where communication system 101 is located within the controlled-environment facility, it may have direct access to AMS or JMS 116. In other embodiments, however, communication system 101 may be located remotely with respect to the controlled-environment facility, and access to AMS or JMS 116 may be obtained via a computer network such as, for example, network 110.

In some embodiments, video visitation devices 103 may be implemented as a computer-based system. For example, each of video visitation devices 103 may include a display, camera, and handset. The display may be any suitable electronic display such as, for example, a Liquid Crystal Display (LCD), a touchscreen display (e.g., resistive, capacitive, etc.), or the like, whereas the camera may be an suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, video visitation devices 103 may be configured to capture a video image of an inmate to be transmitted to a non-resident using the camera, and to display a video image of the non-resident to the inmate using the display. Video visitation devices 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In some cases, video visitation devices 103 may assume the form of any computer, tablet computer, smart phone, etc., or any other consumer device or appliance with videoconferencing capabilities.

Figure 2:
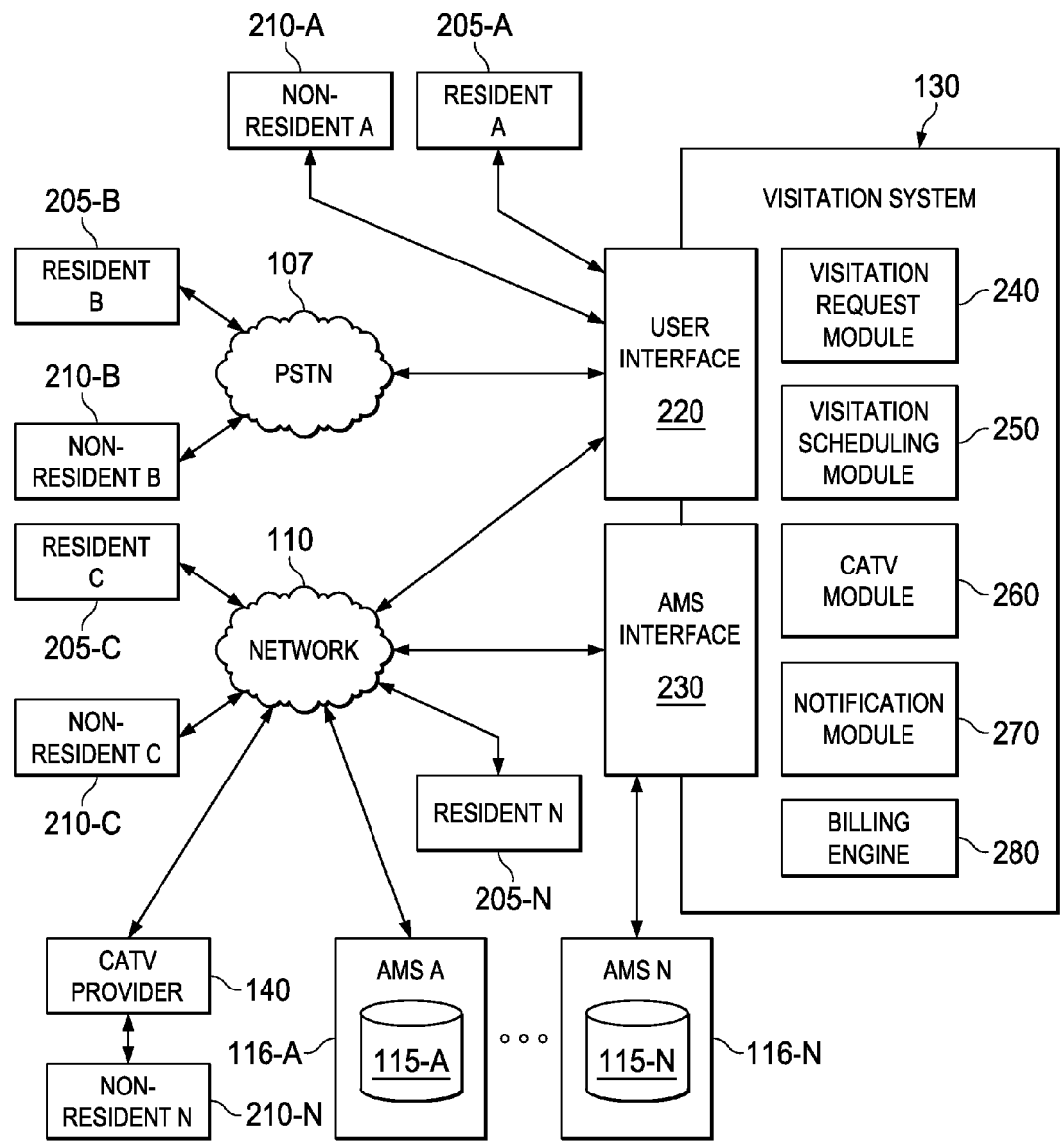
FIG. 2 is a diagram of an example of a video visitation system according to some embodiments.

Referring to FIG. 2, a block diagram of system 130 for providing visitation services to residents of a controlled-environment facility is depicted according to some embodiments. As shown, visitation system 130 includes user interface 220 and AMS or JMS interface 230. In some embodiments, residents and/or non-residents of one or more controlled-environment facilities may access, interact with, or otherwise use visitation system 130 via user interface 220. For example, user interface 220 may be provided as a web interface, IVR interface, or the like.

In some scenarios, resident 205-A and/or non-resident 210-A may connect to visitation system 130 via user interface 220. For example, resident 205-A and/or non-resident 210-A may directly or indirectly (e.g., through an officer or personnel of the controlled-environment facility) reach a computer terminal or a telephone disposed within a controlled-environment facility and request visitation services.

In other scenarios, resident 205-B and non-resident 210-B may interact with user interface 220 via PSTN 107 using an IVR system or the like. Additionally or alternatively, resident 205-C and non-resident 210-C may access a website, webpage, Internet portal, etc. via a computer network or Internet 110, for example, using a personal computing device (e.g., running a web browser), cell phone (e.g., via an "app"), prison terminal, or any other suitable client device.

In yet other scenarios, resident 205-N may access visitation services through user interface 220 via network 110, and non-resident 210-N may access those services via CATV provider 140. When streaming plug-in device 153 is used, such device may also be configured to access user interface 220 via network 110.

In some implementations, parties 205A-N and/or 210A-N may participate in the same multi-party video visitation session concurrently and/or simultaneously. It should be noted that any number of residents and/or non-residents may participate in the same multi-party communication session.

When implemented to support web-based interactions, user interface 220 may be deployed using a number of suitable techniques. For example, user interface 220 may be implemented using Hypertext Markup Language (HTML), Common Gateway Interface (CGI), Javascript, PHP, Perl, C/C++, or any suitable combination of these or other commercial, open source and/or proprietary languages, frameworks or development environments for generating and distributing web-based information. Further, in some implementations, a request and response data may be exchanged between a client and visitation system 130 through the use of messages or documents formatted in eXtensible Markup Language (XML) or other platform-independent data format. For example, in some embodiments, a web services request to provide visitation services may be embodied in an XML document including fields identifying the person(s) that will be participating in the visitation, the type, time, and/or duration of the visitation, and possibly other fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

In some embodiments, visitation system 130 may interact with one or more AMS or JMS systems 116A-N either directly or via a computer network such as the Internet 110. As previously noted, each AMS or JMS system 116A-N may each include its own database 115A-N, respectively. Generally speaking, databases 115A-N may include any suitable type of application or data structure that may be configured as a persistent data repository. For example, databases 115A-N may be configured as relational databases that include one or more tables of columns and rows and that may be searched or queried according to a query language, such SQL or the like. Alternatively, databases 115A-N may be configured as structured data stores that include records formatted according to a markup language, such as XML or the like. In other embodiments, databases 115A-N may be implemented using one or more arbitrarily or minimally structured files managed and accessible through a corresponding type of application.

In addition to interfaces 220 and 230, visitation system 130 includes visitation request module 240, visitation scheduling module 250, CATV module 260, notification or communication module 270, and billing engine 280. Visitation request module 240 may be configured to receive one or more visitation scheduling requests, modification requests, or cancellation requests, for example, via user interface 220. Visitation scheduling module 250 may be configured to execute an incoming request, for example, by scheduling a new visitation, modifying a previously scheduled visitation, or canceling the previously scheduled visitation.

CATV module 260 may be configured to communicate with CATV provider 140 and/or streaming plug-in device 153 and/or to enable visitation sessions. Notification module 270 may be configured to notify a party of a particular visitation, modification, cancelation, etc. Billing engine 280 may be configured to determine parameters such as a type of device being used in the visitation session, a number of parties or devices participating in the visitation session, a type of event, the particular content viewed during the visitation session, a duration of the visitation session, etc. and bill a resident or non-resident for the communication session depending upon those parameters. These, and other techniques, are illustrated in more detail below in connection with FIG. 4 below.

In various embodiments, modules 220-280 shown in FIG. 2 may represent sets of software routines, logic functions, and/or data structures that are configured to perform operations described herein. Although these modules are shown as distinct logical blocks, in other embodiments at least some of the functionality provided by these modules may be combined into fewer blocks. Conversely, one or more of modules 220-280 may be implemented such that it is divided among two or more logical blocks. Moreover, although shown with a particular configuration, in other embodiments these various modules may be rearranged in other ways.

Also, in certain embodiments, each of the different components of visitation system 130 may be implemented in software, hardware or any suitable combination thereof, in an integrated fashion (e.g., on a single server or computer system) or in a distributed fashion (e.g., via a number of discrete systems configured to communicate with one another via a network). Additionally or alternatively, the operation of visitation system 130 may be partitioned into components in a different fashion than illustrated in FIG. 2.

Figure 3:
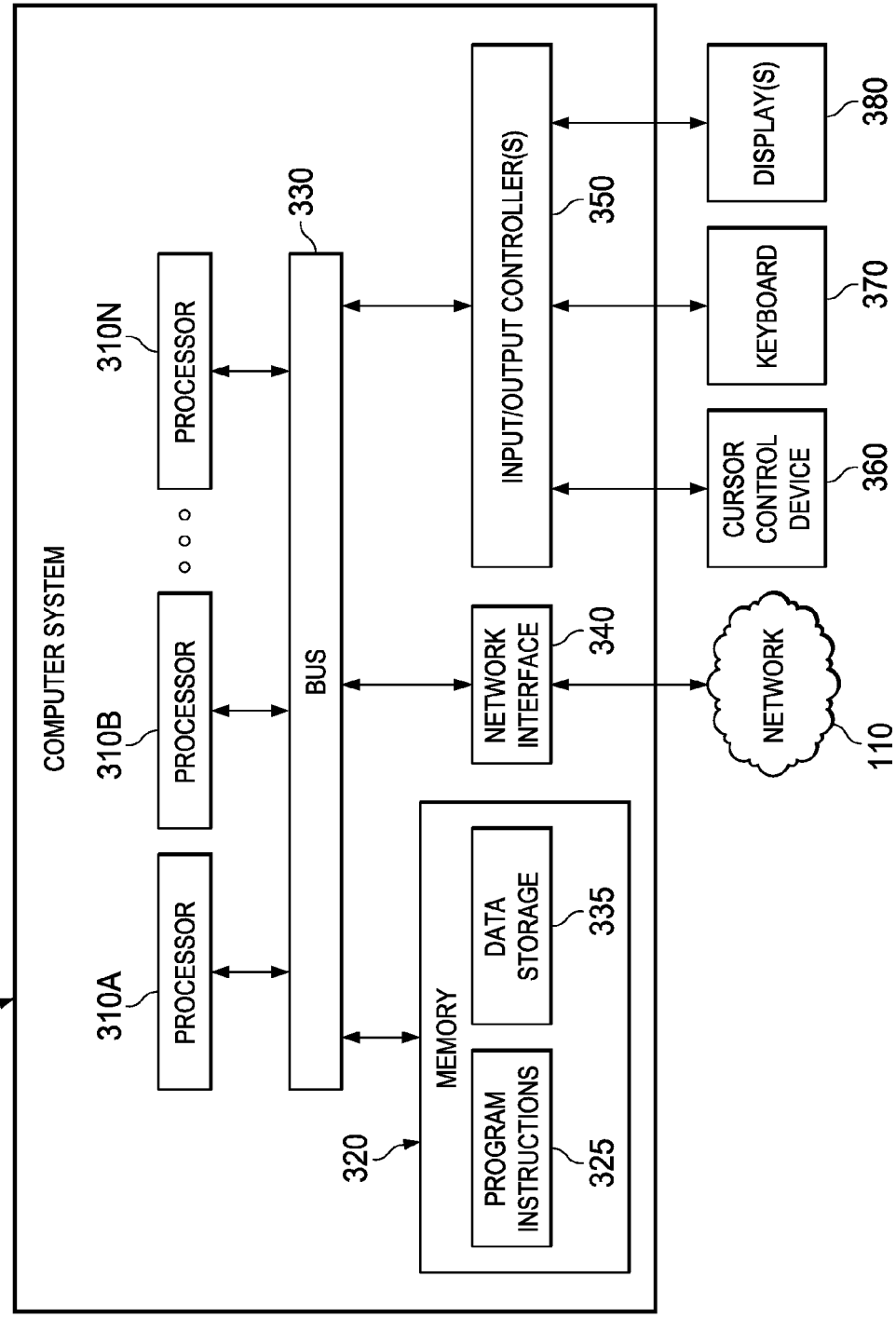
FIG. 3 is a block diagram of an example of a computer system configured to implement various systems and methods described herein according to some embodiments.

Embodiments of systems and methods for remote multi-party and/or event-driven visitation for residents of controlled-environment facilities, as described herein, may be implemented or executed by one or more computer systems. One such computer system is illustrated in FIG. 3. In various embodiments, computer system 300 may be a server, a mainframe computer system, a workstation, a network computer, a desktop computer, a laptop, or the like. For example, in some cases, one or more of the various blocks shown in FIG. 2 may be implemented as computer system 300. As explained above, in different embodiments these various computer systems may be configured to communicate with each other in any suitable way, such as, for example, via network 110.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360-380 may be capable of communicating with I/O controllers 350, for example, via a wired connection (e.g., serial port, USB port) or wireless connection (e.g., Wi-Fi, Bluetooth, Near Field Communications Link, etc.). Other devices may include, for example, cameras, microphones, antennas/wireless transducers, etc.

In various embodiments, computer system 300 may be a single-processor system including one processor 310A, or a multi-processor system including two or more processors 310A-N (e.g., two, four, eight, or another suitable number).

Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as those described herein may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the device, including network interface 340 or other peripheral interfaces, such as input/output devices 360-380. In some embodiments, bus 330 may perform any necessary protocol, timing or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all of the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data may be accessible by program instructions 325. In an embodiment, program instructions 325 may include software elements of embodiments illustrated herein. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 4:
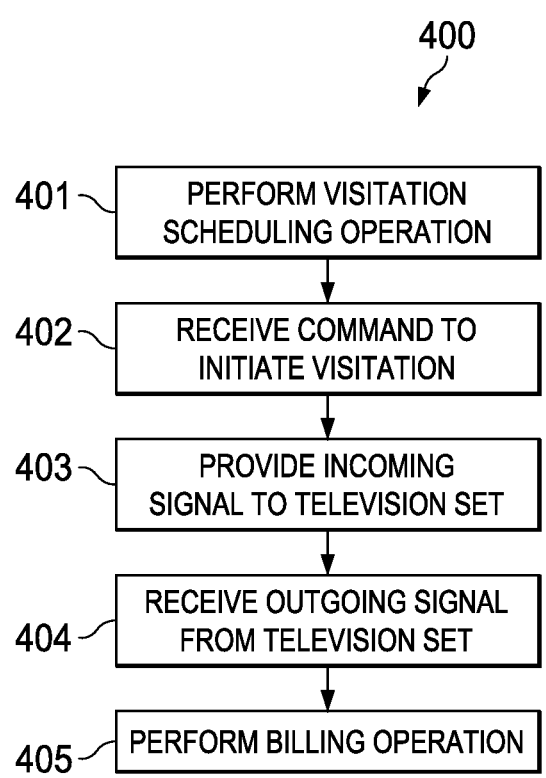
FIG. 4 is a flowchart of an example of a method for providing remote visitation and other services to non-residents of controlled-environment facilities via display devices according to some embodiments.

FIG. 4 is a flowchart of an example of a method for providing remote visitation and other services to non-residents of controlled-environment facilities via display devices according to some embodiments. At block 401, method 400 includes performing a visitation scheduling operation. For example, method 400 may include receiving a request for a remote visitation from a resident and/or from a non-resident of a controlled-environment facility. Such a request may be received, for example, via user interface 220 at visitation request module 240 of visitation system 130. In some cases, the request for visitation may be received in a format such as, for example, via the Internet (e.g., as an HTTP message or the like,), by e-mail, text message, Short Message Service (SMS) communication, telephone call, IVR input, etc.

When received from a resident, the request may specify one or more individual non-residents (e.g., by first and last name, by telephone number, by address, by driver's license or social security number, etc.) and/or other residents with whom the resident wishes to have a video visitation session. Conversely, when received from a non-resident, the request may specify one or more individual residents (e.g., by inmate identification number, by name, by driver's license or social security number, etc.) and/or other non-residents with whom the non-resident wishes to have the video visitation session. Additionally or alternatively, the request may identify a category of or group of individuals, such as, for example, "siblings," "parents," etc.

Additionally or alternatively, the request may indicate a desired date of the video visitation, a desired time of the video visitation, and/or a desired duration of the video visitation. Additionally or alternatively, the request may include an identification of one of a plurality of controlled-environment facilities, an identification of one or more of a plurality of different locations for the video visitation within a given controlled-environment facility, or an identification of one or more of a plurality of different video visitation terminals within the given controlled-environment facility.

Still as part of the scheduling operation of block 401, visitation scheduling module 250 may receive the incoming request and make one or more determinations about the desired video visitation. For example, when the request identifies a category of individuals (as opposed to one or more particular individuals), visitation scheduling module 250 may identify a list of persons whose visitation is being requested. In an embodiment, visitation scheduling module 250 may interact with one or more of databases 115A-N to determine a list of available persons for an inmate. In some implementations, the identified list may be specifically suited for the requesting inmate's particular circumstances.

Still at block 401, the request may identify an event by name, type, location, date, and/or time. For example, the request may inform that the requested visitation session relates to a birthday, funeral, wedding, graduation, or any other suitable event such that, during the visitation session, the resident(s) and/or non-resident(s) may be allowed to remotely view, attend, or participate in the event using a communication device within the controlled-environment facility or outside of the controlled-environment facility.

In some embodiments, the event may include a television program or show, a home video presentation, a slideshow presentation, a motion picture, a multi-player video game, etc. For example, such content may be transmitted to the resident and to the non-resident simultaneously or concurrently by CATV provider 140 and/or streaming plug-in device 153 of FIG. 1. During the requested visitation session, the resident may use a communication device within the controlled-environment facility to view the event simultaneously and/or concurrently with one or more non-residents.

When the event is to be furnished or hosted by CATV provider 140, for instance, block 401 may include a scheduling negotiation between visitation system 130 and a non-resident requesting the session. Particularly, because the facility may have visitation rules that determine when visitation is available to its residents, what types of television programs or other content may be watched by the resident, etc., there may be a conflict between those rules and the type or time of the event. Accordingly, in some cases, visitation system 130 may provide the available schedule and/or other constraining parameters to the requestor prior to the requestor's scheduling of the event.

At blocks 402, method 400 includes receiving a command to initiate the scheduled visitation session. At block 403, method 400 includes providing an incoming multimedia visitation signal to the non-residents television set, and at block 404 method 400 includes providing an outgoing multimedia visitation signal to the resident.

In some implementations, the incoming and outgoing multimedia visitation signals may include a video signal, an audio signal, and/or a combination thereof, including but not limited to packetized signals, from a resident, a non-resident, and/or CATV provider 140, and may distribute those signals across the communication devices operated by participants of the session. When the session is over or scheduled to be over, visitation system 130 may terminate each respective connection.

Here it should be noted that blocks 403 and 404 may operate concurrently to enable a full-duplex video visitation session to take place. While the visitation is ongoing, or at some other suitable time, method 400 may include, changing an aspect of a television programming available to the non-resident based, at least in part, upon the remote visitation session. For example, method 400 may include modifying a channel lineup, an order of channels in a television guide, using a separate video input (HDMI) or a television advertisement. These modifications may be made, for instance, based upon the content of the communications taking place during the visitation and/or based upon the identity of the parties, and/or based upon the fact that remote visitation services are being used where one of the parties is a resident of a controlled-environment facility. In some cases, these targeted modifications may be used as an additional revenue stream and/or to subsidize the cost of the system to the parties.

In some cases, while enabling the session, visitation system 130 may record and/or allow an investigator or facility personnel to monitor the visitation using his or her own communication device or computer system. Specifically, in some cases, the investigator may be added as a participant to the session, and may be able to access the video signal and/or audio signal accessible by the resident and/or non-resident(s).

At block 405, billing module 280 may bill the resident and/or non-resident(s) for the visitation session. In some cases, the resident or at least one or more non-residents may be billed, at least in part, depending upon a number of persons participating in the session and/or the number of communication devices involved in the remote group visitation session. Additionally or alternatively, resident and/or non-resident(s) may also be billed according to the type of event, duration of the event, date and/or time of the event, television program or motion picture, etc.

In some implementations, an amount billed to the resident due to a group, multi-party, or event-driven visitation session may be collected from the resident's calling account, commissary account, or the like. Additionally or alternatively, the amount may be billed to the non-resident via CATV provider's monthly statement.

In some embodiments, in addition to enabling visitation sessions to take place via a non-residents television set, the systems and methods described herein may further allow the non-resident to access or manage other controlled-environment services relating to a particular resident. For example, a non-resident may access AMS interface 230 via receiver 152 and television set 151 and perform operations such as, for instance, participating in a commissary transaction (deposit money in a resident's account, purchase commissary items, etc.), participating in a calling transaction (e.g., deposit money in a calling account, pay outstanding charges, etc.) or other financial transaction. Additionally or alternatively, the non-resident may access AMS interface 230 via receiver 152 and television set 151 to access status information (e.g., pending charges, expected release date, contact information, medical history, etc.) associated with the resident to the non-resident through the television set.

It should be understood that the various operations described herein, particularly in connection with FIG. 4, may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The various systems and methods illustrated in the figures and described herein represent example embodiments. The methods may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
    performing, by one or more computer systems:
        determine a permitted schedule for a remote visitation session between a resident and a non-resident of a controlled-environment facility;
        receiving a command to initiate the remote visitation session;
        enabling the non-resident's participation in the remote visitation session, wherein the non-resident participates in the remote visitation session using a display device, wherein the display device is one of a television set, a projector, or a monitor, and wherein the display device provides the non-resident with one or more programming options; and
        changing an aspect of the programming options available to the non-resident via the display device based, at least in part, upon the remote visitation session, wherein changing an aspect of the programming options available to the non-resident includes changing the programming available to the non-resident, modifying a lineup of channels available to the non-resident, modifying an ordering of channels available to the non-resident, or changing an advertisement displayed to the non-resident, and wherein the aspect of programming is changed during the permitted remote visitation session schedule, and wherein changing an aspect of the programming options available to the non-resident further includes enabling the non-resident's participation in a commissary transaction or a financial transaction associated with the resident.

2. The method of claim 1, wherein the one or more computer systems are configured to transmit the remote visitation session via a cable or satellite service provider.

3. The method of claim 1, wherein the controlled-environment facility is a correctional facility and wherein the resident is a prisoner, inmate, detainee, or arrestee.

4. The method of claim 1, wherein enabling the non-resident's participation in the remote visitation session includes providing an incoming multimedia visitation signal to the display device through a cable or satellite receiver and receiving an outgoing multimedia visitation signal from the display device through the cable or satellite receiver.

5. The method of claim 4, wherein the outgoing multimedia signal includes a video image of the non-resident captured by a camera coupled to or integrated into the display device.

6. The method of claim 1, further comprising:
    allowing the non-resident to participate in the visitation session using a remote control associated with the display device.

7. The method of claim 1, wherein enabling the non-resident's participation in the remote visitation session includes providing an incoming multimedia visitation signal to the display device through a streaming plug-in device and receiving an outgoing multimedia visitation signal from the display device through the streaming plug-in device, wherein the streaming plug-in device is coupled to or otherwise integrated into the display device.

8. A video visitation device, comprising:
    at least one processor; and
    a memory coupled to the at least one processor, the memory configured to store program instructions executable by the at least one processor to cause the video visitation device to:
        determine a permitted schedule for a remote visitation session between a resident and a non-resident of a controlled-environment facility;
        receive a command to initiate the remote visitation session;
        enable the non-resident's participation in the remote visitation session, wherein the non-resident participates in the remote visitation session via a display device, wherein the display device is one of a television set, a projector, or a monitor, and wherein the display device provides the non-resident with one or more programming options; and
        change an aspect of the programming options available to the non-resident via the display device based, at least in part, upon the remote visitation session, wherein changing an aspect of the programming options available to the non-resident includes changing the programming available to the non-resident, modifying a lineup of channels available to the non-resident, modifying an ordering of channels available to the non-resident, or changing an advertisement displayed to the non-resident, and wherein the aspect of programming is changed during the permitted remote visitation session schedule, and wherein changing an aspect of the programming options available to the non-resident further includes enabling the non-resident's participation in a commissary transaction or a financial transaction associated with the resident.

9. The video visitation device of claim 8, wherein the outgoing multimedia visitation signal is provided to the display device through a television channel available to the non-resident via the cable or satellite box.

10. The video visitation device of claim 8, wherein the video visitation device includes a streaming device.

11. The video visitation device of claim 8, the program instructions further executable by the at least one processor to cause the video visitation device to provide status information associated with the resident to the non-resident through the display device.

12. A non-transitory tangible computer-readable storage medium having program instructions stored thereon that, upon execution by a remote visitation system, cause the remote visitation system to:
   determine a permitted schedule for a remote visitation session between a resident and a non-resident of a controlled-environment facility;
   receive a command to initiate the remote visitation session;
   enable the non-resident's participation in the remote visitation session, wherein the non-resident participates in the remote visitation session via a display device, wherein the display device is one of a television set, a projector, or a monitor, and wherein the display device provides the non-resident with one or more programming options; and
   change an aspect of the programming options available to the non-resident via the display device based, at least in part, upon the remote visitation session, wherein changing an aspect of the programming options available to the non-resident includes changing the programming available to the non-resident, modifying lineup of channels available to the non-resident, modifying an ordering of channels available to the non-resident, or changing an advertisement displayed to the non-resident, and wherein the aspect of programming is changed during the permitted remote visitation session schedule, and wherein changing an aspect of the programming options available to the non-resident further includes enabling the non-resident's participation in a commissary transaction or a financial transaction associated with the resident.

13. The non-transitory tangible computer-readable storage medium of claim 12, wherein the outgoing multimedia visitation signal is provided to the display device through a television channel available to the non-resident via the cable or satellite box.

14. The non-transitory tangible computer-readable storage medium of claim 12, wherein the video visitation system includes a streaming device, and wherein enabling the remote visitation session includes providing an incoming multimedia visitation signal to the display device through a television input via the streaming device.

15. The non-transitory tangible computer-readable storage medium of claim 12, the program instructions further executable by the remote visitation system to enable the non-resident to provide status information associated with the resident to the non-resident through the display device.

16. The tangible computer-readable storage medium of claim 12, wherein the remote visitation system is configured to transmit the remote visitation session via a cable or satellite service provider.

17. The video visitation device of claim 8, wherein the video visitation device is configured to transmit the remote visitation session via a cable or satellite service provider.

* * * * *